UNITED STATES PATENT OFFICE.

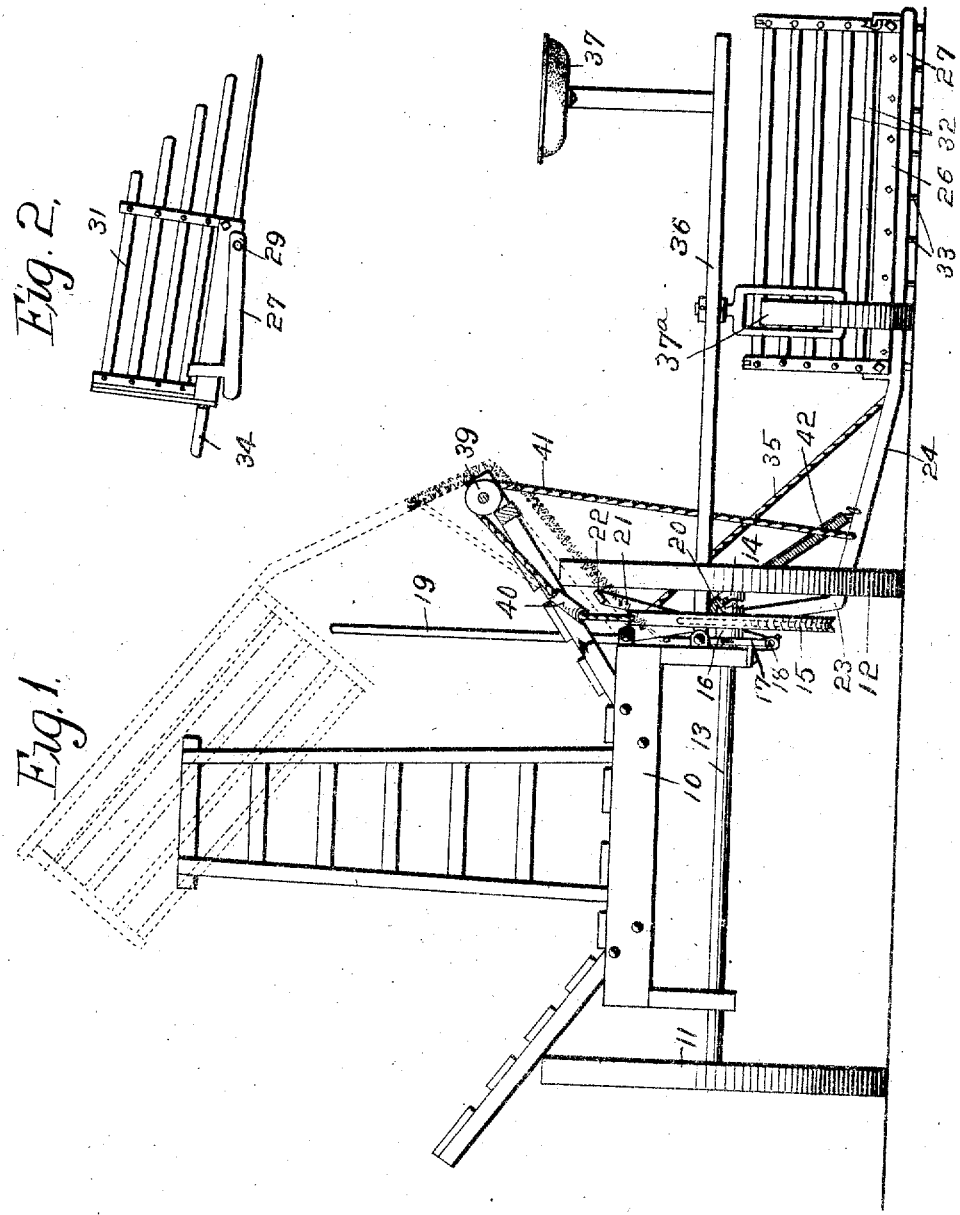

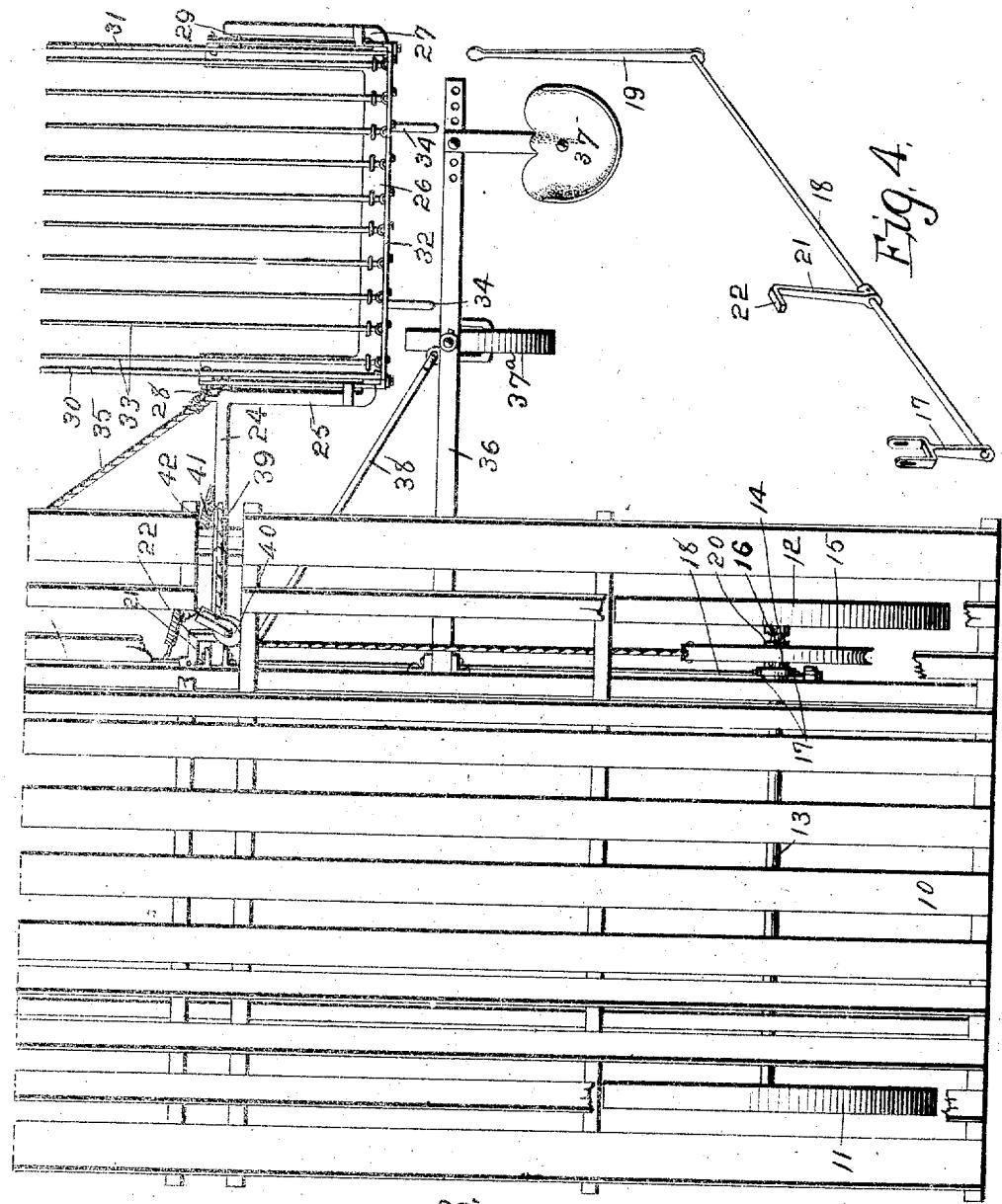

W. LAVERENCE, OF DES MOINES, IOWA.

SHOCK-LOADER.

No. 875,535.　　　Specification of Letters Patent.　　　Patented Dec. 31, 1907.

Application filed October 30, 1906. Serial No. 341,326.

*To all whom it may concern:*

Be it known that I, JOHN W. LAVERENCE, a citizen of the United States, residing at Des Moines, in the county of Polk and State of Iowa, have invented a certain new and useful Shock-Loader, of which the following is a specification.

The objects of my invention are to provide a loader for loading hay and the like of simple, durable and inexpensive construction which is controlled by the person loading the wagon as the rack is being advanced by the draft animals over the ground surface.

A further object is to provide a device which can be easily attached to the side of the rack so that a single pair only of draft animals is necessary; that is, the same draft animals which draw the rack serve to operate the loader.

A further object of my invention is to provide a swinging arm at one side of the wagon rack which picks up the shocks of grain or hay, and when thrown into operative relation with the rear traction wheels, will elevate the shocks of grain or hay gathered by it onto the wagon rack.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 is a rear elevation of the wagon rack and my gathering device. Fig. 2 is a detail side elevation of the gathering mechanism. Fig. 3 is a plan view of my gathering device and a portion of the wagon rack to which it is attached, and Fig. 4 is a detail view of the clutch operating mechanism.

Referring to the accompanying drawings, I have used the reference numeral 10 to indicate the rack which is mounted on the ordinary wagon wheels. The rear wheels I have numbered 11 and 12. Each of these wheels are mounted on, and preferably rigidly secured to the driving shaft 13. The traction wheel 12 has a ratchet faced clutch 14 on its inner side. Rotatably and slidingly mounted on the shaft 13 is a grooved pulley 15. Pivotally connected with the hub 16 of the grooved pulley 15 is a rock arm 17, so arranged that the grooved pulley 15 may rotate freely and yet it will allow the grooved pulley to be moved longitudinally of the shaft 13 by means of it. The rock arm 17 is rigidly secured to one end of a shaft 18 which extends longitudinally of the side of the frame, and which has attached at its forward end an operating lever 19, so arranged that as the operating lever 19 is moved outwardly at its upper end, the rock arm 17 is correspondingly moved to draw the grooved pulley 15 outwardly and force the ratchet faced clutch 20 which forms the outer face of its hub 16 into engagement with the ratchet faced clutch 14, and causes the pulley to be operated as the traction wheels 11 and 12 are operated.

Rigidly connected with the central portion of the shaft 18 is a clutch releasing lever 21 having a right angled extension 22 on its upper end. This lever is so arranged that as it is engaged by the arm of the gathering mechanism, to be hereinafter described, it causes the clutches 14 and 20 to be thrown out of engagement with each other and thus releases the grooved pulley 19 to allow the gathering device to be returned to its point of starting, in the manner hereinafter set forth.

I have provided a gathering device which comprises a supporting arm having a downwardly extending portion 23 pivoted to the side of the bottom of the rack, a portion 24 extending outwardly from the portion 23, a member 25 extending rearwardly from the portion 24, a member 26 extending outwardly from the member 25 and a member 27 extending forwardly from the member 26 and substantially parallel with the member 25. Extending outwardly from the junction of the member 25 and the portion 24 is a pivot 28. Extending inwardly from a point adjacent to the forward end of the member 27 is a pivot 29. Pivotally mounted on the pivots 28 and 29 is a gathering device having two sides 30 and 31 and a rear portion 32 connecting these sides. Secured to the back portion 32 is a series of teeth 33. Secured to the back portion and extending rearwardly therefrom are two handles 34 by which the operator guides the gathering device.

Secured to the side of the bottom of the rack and to the outer end of the member 24 of the supporting arm is a cable 35 for holding the gathering device against rearward strains as it is advanced. Pivoted to and extending outwardly from the side of the bottom of the rack is a seat support having the seat 37 adjustably secured to its outer end.

Pivotally secured to the central portion of the seat support 36 is a guide wheel 37ᵃ for supporting the outer end of the seat support. Connecting the central portion of the seat support 36 and the side of the bottom of the rack is a brace 38. I have mounted two idlers 39 and 40 on the rack. Secured at one end to the member 24 of the supporting arm of the gathering device is a rope 41 which passes over the idlers 39 and 40, and is secured at its other end to the grooved pulley 15 in such a way that as the grooved pulley 15 is thrown into operative relation with the traction wheel 12, the gathering device will be swung upwardly from the position shown in Fig. 1 to the position shown in dotted lines on said figure; that is, the gathering device will be elevated from a gathering position at one side of the rack to a delivering position above the rack. The spring 42 is attached at one end to the side of the rack and to the member 24 of the supporting arm for starting the gathering device from its extreme elevated position and to assist gravity in returning it as the gathering device approaches the ground, the spring 42 is expanded downward and outward and consequently serves to break the force of the fall of the gathering device.

In use an operator sits upon the seat 37 and directs the movement of the gathering device. Another operator drives the draft animals, and when a sufficient load has been picked up by the gathering device, the operator on the wagon manipulates the operating lever 19 and throws the clutch 20 in engagement with the clutch 14, which causes the gathering device to be elevated from a position at one side of the wagon to a position above the wagon, as shown in dotted lines in Fig. 1, and when the supporting arm engages the right angled extension 22 of the clutch releasing lever 21, the clutch is thrown out of engagement and the gathering device allowed to fall by gravity to its gathering position, assisted by the spring 42 which also assists in breaking the force of the fall as the gathering device approaches the ground surface.

Having thus described my invention, what I claim and desire to secure by Letters Patent of the United States, therefor is:

1. In a shock loader, the combination of a vehicle having a shaft and wheels mounted on the shaft; one of said wheels being provided at its inner side with a clutch member, a pulley carried by the shaft and movable in the direction of the length thereof and having a clutch member opposed to that of the wheel, a rock shaft carried by the vehicle and having an arm connected with the pulley and also having a shaft-operating arm and a handle, a gathering device arranged alongside the vehicle, a vertically swinging supporting arm for the gathering device, pivoted to the vehicle and arranged when swung upward to engage the shaft-operating arm of the rock-shaft, the shaft operating arm being located in the path of the vertical swinging arm, and a cable passed over guides on the vehicle and connected at one end to the pulley and at its opposite end to the supporting arm of the gathering device.

2. In a shock loader, the combination of a vehicle having a shaft and wheels mounted on the shaft; one of said wheels being provided at its inner side with a clutch member, a pulley carried by the shaft and movable in the direction of the length thereof and having a clutch member opposed to that of the wheel, a rock shaft carried by the vehicle and having an arm connected with the pulley and also having a shaft-operating arm and a handle, a gathering device arranged alongside the vehicle, a vertically swinging supporting arm for the gathering device, pivoted to the vehicle and arranged when swung upward to engage the shaft-operating arm of the rock-shaft, the shaft-operating arm being located in the path of the vertical swinging arm, a cable passed over guides on the vehicle and connected at one end to the pulley and at its opposite end to the supporting arm of the gathering device, and a tractile spring connected at one end to the supporting arm of the gathering device and at its opposite end to the vehicle at a point above the supporting arm when the latter is in its lower position.

3. In a shock loader, the combination of a vehicle, a supporting arm pivoted to the vehicle and arranged to swing in the direction of the width thereof and having parallel portions arranged parallel to the side of the vehicle and also having a portion connecting the rear ends of said parallel portions, a gathering device pivoted on the parallel portions of the supporting arm and arranged to swing vertically, and means for raising the supporting arm.

4. In a shock loader, the combination of a vehicle, a supporting arm pivoted to the vehicle and arranged to swing in the direction of the width thereof and having parallel portions arranged parallel to the side of the vehicle and also having a portion connecting the rear ends of said parallel portions, a gathering device carried by the supporting arm and arranged to swing vertically, and means for raising the supporting arm.

JOHN W. LAVERENCE.

Witnesses:
  W. R. LANE,
  W. D. LATCHAT.